United States Patent [19]
Sandberg

[11] 3,744,818
[45] July 10, 1973

[54] ENERGY ABSORBING FASTENER STRUCTURES

[75] Inventor: Gary K. Sandberg, Oloha, Oreg.

[73] Assignee: Omark Industries, Inc., Portland, Oreg.

[22] Filed: Aug. 26, 1971

[21] Appl. No.: 175,209

[52] U.S. Cl. ............................................ 280/150 B
[51] Int. Cl. ......................................... B60r 27/00
[58] Field of Search .................. 280/150 B; 188/1 C

[56] References Cited
UNITED STATES PATENTS

| 3,105,702 | 10/1963 | Larson | 280/150 B |
| 3,524,678 | 8/1970 | Lavenne | 280/150 B |
| 2,717,162 | 9/1955 | Walters | 280/150 B |

Primary Examiner—Leo Friaglia
Assistant Examiner—Robert R. Song
Attorney—Stephen W. Blore, John R. Hall et al.

[57] ABSTRACT

Padded panels are mounted in the dashboard areas of vehicles by energy absorbing fastener units. Split clamp dies swage wire fasteners when closed and draw the wire fasteners to absorb energy of impact. Another fastener structure includes an externally threaded nut and a washer-like die on a drawable rod. Another fastening structure includes a headed nut and a washer-like die on a drawable rod.

1 Claim, 12 Drawing Figures

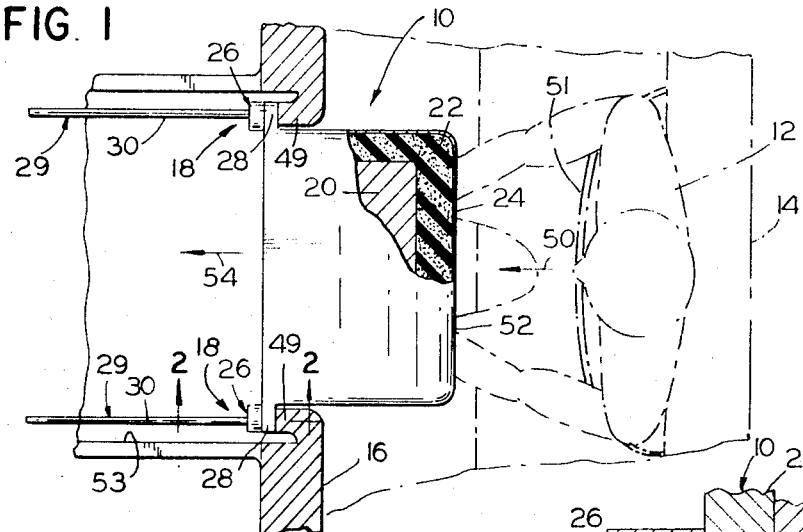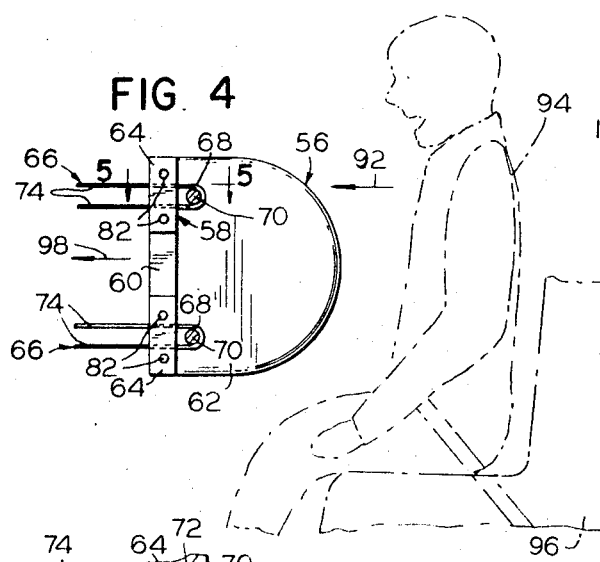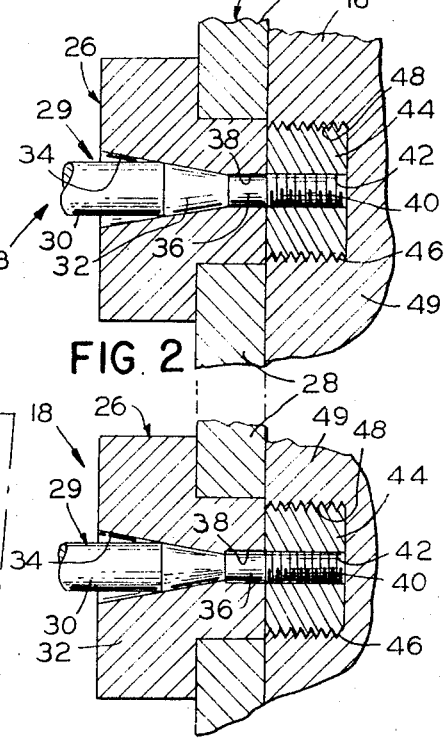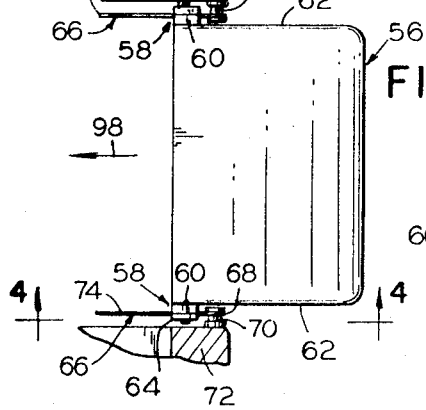

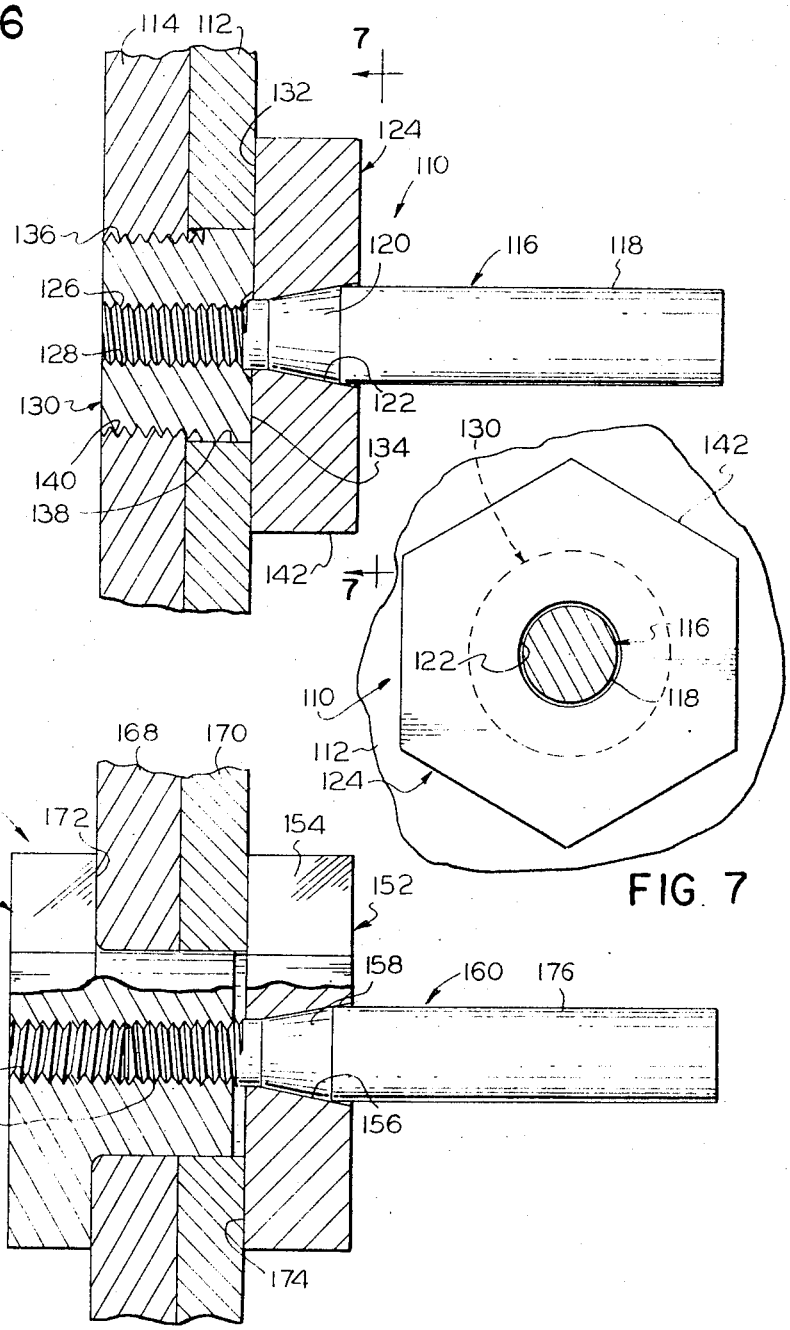

GARY K. SANDBERG
INVENTOR

BY
BUCKHORN, BLORE, KLARQUIST & SPARKMAN
ATTORNEYS

ENERGY ABSORBING FASTENER STRUCTURES

This invention relates to energy absorbing fastener structures and more particularly to improved energy absorbing fastener structures.

An object of the invention is to provide energy absorbing fastener structures.

Another object of the invention is to provide improved energy absorbing fastener structures.

A further object of the invention is to provide cushioned panels positioned forwardly of and aligned with occupants of an automobile seat and secured to the dashboard of the automobile by energy absorbing fastener devices.

Another object of the invention is to provide a fastener structure having an externally threaded nut retaining a washer-like die on a drawable rod.

Another object of the invention is to provide a headed nut screwed onto a threaded shank of a drawable rod on which a washer-like die is positioned.

Another object of the invention is to provide a load-indicating fastener structure including a bolt and a washer in which one is deformable with a predetermined force as the bolt is tightened to insure that the bolt is tight.

IN THE DRAWINGS:

FIG. 1 is a plan view of an energy absorbing bumper structure forming one embodiment of the invention;

FIG. 2 is an enlarged, fragmentary vertical sectional view taken along line 2—2 of FIG. 1;

FIG. 3 is a plan view of an alternate embodiment of the invention;

FIG. 4 is a vertical sectional view taken along line 4—4 of FIG. 3;

FIG. 5 is an enlarged, fragmentary plan sectional view taken along line 5—5 of FIG. 4;

FIG. 6 is a fragmentary vertical sectional view of an energy absorbing fastener structure forming an alternate embodiment of the invention;

FIG. 7 is a fragmentary vertical sectional view taken along line 7—7 of FIG. 6;

FIG. 8 is a fragmentary vertical sectional view of an energy absorbing fastener structure forming an alternate embodiment of the invention;

Figure 9:
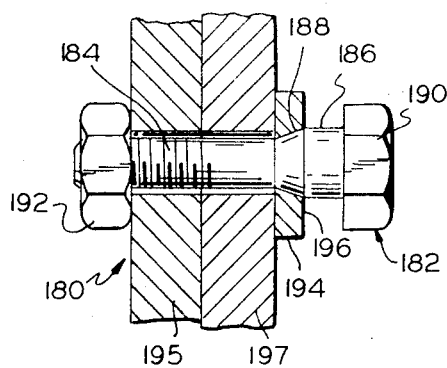
FIG. 9 is a fragmentary vertical sectional view of an energy absorbing fastener structure forming an alternate embodiment of the invention and in one condition.

Referring now in detail to the drawings, there is illustrated in FIGS. 1 and 2 an energy absorbing buffer panel structure including a buffer panel 10 positioned in line with a passenger 12 sitting in seat 14 and secured to the dash panel 16 of an automobile by energy absorbing fasteners 18. The buffer panel 10 has a solid core 20 overlayed with a padding material 22 such as foam rubber. The foam padding is covered with a layer of vinyl 24. The fasteners 18 include flanged drawing dies 26 attached to side projecting flanges 28 forming part of the buffer panel 10. Each fastener 18 also has a drawable rod 29 having a drawable portion 30 converging into a tapered transition portion 32 that is complementary to a tapered drawing portion 34 of the die 26. A reduced diameter shank 36 passes through a relief bore 38 in the die 26 and has a threaded end portion 40 screwed into a tapped bore 42 of a transition bushing 44. The bushing 44 has external threads 46 screwed into a tapped bore 48 in mounting portions 49 of the panel 16.

The fasteners 18 hold the buffer panel 10 in the position shown in FIG. 1 under normal conditions but upon an impact stops the forward momentum and will cause the passenger 12 to move forward in the direction of the arrow 50 bringing the passenger in contact with front curved surface 52 of the padded buffer 10, causing it to move as indicated by arrow 54. As this happens, the energy absorbing rods 29 are drawn by the action of dies 26 to absorb the force thereby providing safe deceleration for the passenger. Preferably the passenger is initially restrained by an energy absorbing seat belt structure 51, which absorbs part of the inertial force of the passenger prior to contact of the passenger with the buffer panel and also continues to absorb part of the energy while the buffer panel is moved forwardly to absorb energy. The buffer panel, when moved forwardly, is guided by a horizontal guideway 53 forming part of the dash panel framework.

EMBODIMENT OF FIGS. 3 TO 5

An energy absorbing buffer panel structure forming an alternate embodiment of the invention includes padded buffer panel 56 having mounted on its sides split clamp dies 58 including a base die plate 60 rigidly secured to side 62 of the padded buffer 56 and clamping die plates 64. U-shaped drawable wires 66 have rounded ends or loops 68 contained by pins 70 mounted on dash panel 72 of a vehicle. Each of the wires has two drawable leg portions 74 placed between the die plates 60 and 64. The die plates have tapered drawing portions 76, reduced diameter sections 78 and tapered relief areas 80 as best illustrated in FIG. 5. Each of the die plates 60 and 64 contain only half of the die shape, but when placed together the die 58 is complete. Capscrews 82 pass through holes 84 in clamping die plate 64 and holes 86 in base plate 60 and are screwed into tapped holes 88 in the buffer panel 56. The action of tightening the capscrews 82 draws down the die plate 64 into proper position and swages the leg portions 74 to form reduced shanks 90. As can be seen from the drawings, no taper preforming of the wire 66 is required as it is all completed in assembly.

In the event of an extreme force in the direction of arrow 92, the passenger 94 will first draw out or extend energy absorbing belt 95 and move forward against the buffer panel 56 which is being held in position by the drawable U-shaped wires 66. Then, if the force is not dissipated, the passenger moves the buffer in the direction of the arrow 98 carrying with it clamping dies 58 which draw the wires 66 to further absorb the energy.

It can be seen from the drawings that the use of one of the padded buffer panel structures, with or without energy absorption by the seat belts, gives the passenger a high degree of safety upon an impact stop.

EMBODIMENT OF FIGS. 6 AND 7

An energy absorbing fastener unit 110 forming an alternate embodiment of the invention normally holds plate 112 against plate 114 thus preventing their separation until a predetermined separating force is reached, the plates 112 and 114 being, for example, an automobile seat and seat bracket. The fastener unit 110 includes a drawable rod 116 having an elongated drawable shank section 118, which is tapered at 120 to complement a tapered or frustoconical drawing portion 122 of a hexagonal, washer-like die 124. The shank of rod 116 has threads 126 which are screwed into a tapped bore 128 of a transition plug or externally threaded nut 130, thereby pulling tapered portion 120 tightly into contact with tapered drawing portion 122, and locking fact 132 of the die 124 to surface 134 of plug 130. External threads 136 of plug 130 pass freely through a bore 138 in plate 112 and are screwed into a tapped bore 140 in the plate 114 to hold the plates 122 and 114 tightly together. Flats 142 of the hexagonal die 124 provide wrench flats for securing the fastener.

The washer or nut-shape of die member 124 provides savings in manufacturing costs by being formed by sawing or parting each die member in the proper width from hexagonal stock material of a hardness that is substantially greater than that of the drawable rod 116. When an extreme separating force is applied to plates 112 and 114, the rod 116 is drawn through the die 124 thereby absorbing the energy of the separating force. The size of the hexagonal die 124 gives a large bearing surface at 132 to resist distortion during drawing of rod 116. The large size of the die 124 also permits a greater area for heat absorption to reduce the annealling or softening effect of the heat.

EMBODIMENT OF FIG. 8

An energy absorbing fastener unit 150 forming an alternate embodiment of the invention includes a hexagonal washer-like die 152 having wrench flats 154 on its periphery and a tapered or frustoconical drawing portion 156 that retains tapered portion 158 of a drawable rod 160 tightly in place when threaded end 162 of rod 160 is screwed into tapped bore 164 of a clamping bushing-like nut 166. Two plates 168 and 170 are normally kept from separating by being held between surface 172 or clamping nut 166 and face 174 of the drawing die 152. When plates 168 and 170 start to separate under extreme force, the drawable shank 176 of rod 160 is drawn through the tapered hole 156 of the die 152 thereby dissipating the energy in extruding the rod 160.

Figure 10:
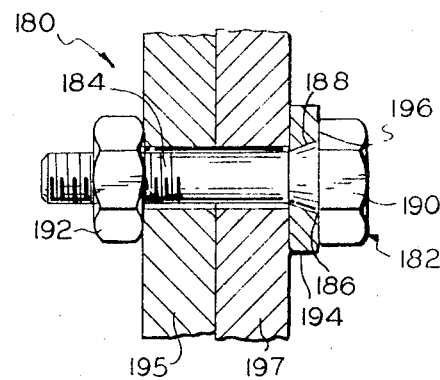
FIG. 10 is a fragmentary vertical sectional view of the energy absorbing fastener structure of FIG. 9 when in a different, tightened condition.

EMBODIMENTS OF FIGS. 9 and 10

A load-indicating fastener structure 180 forming an alternate embodiment of the invention includes a headed bolt 182 having a threaded shank 184 and an enlarged, drawable shoulder 186 having a frustoconical transition portion 188. The bolt has a hex head 190, and a nut 192 when screwed onto the threaded shank with a desired predetermined force draws the portion 188 through a washer-like die 194 from the loose position shown in FIG. 9 to the tight position clamping plates 195 and 197 together and shown in FIG. 10, in which the head abuts or nearly abuts the die 194, thus assuring the user that the bolt is under at least a predetermined minimum tension. That is, when there is no appreciable gap between the head 190 and the washer, the bolt is loaded. If desired, the die may have a brightly colored face 196 which is of such a size as to be completely covered when the head 190 abuts the die. Thus, absence of a gap or color indicates a mimimum bolt tension. No special tools are required to assure a minimum tension on the bolt.

Figure 11:
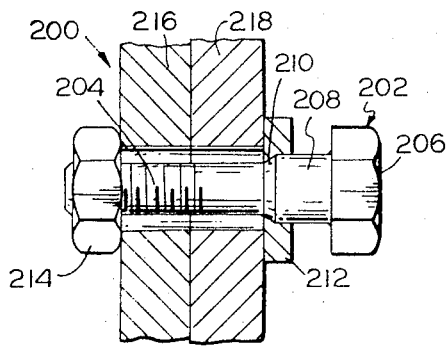
FIG. 11 is a fragmentary vertical sectional view of an energy absorbing fastener structure forming an alternate embodiment of the invention and in one condition.
Figure 12:
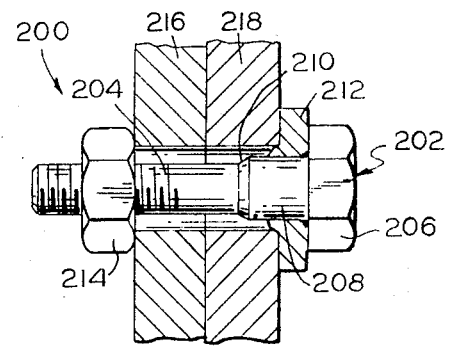
FIG. 12 is a fragmentary vertical sectional view of the energy absorbing fastener structure of FIG. 11 when in a different, tightened condition.

EMBODIMENT OF FIGS. 11 and 12

A load-indicating fastener structure 200 forming an alternate embodiment of the invention includes a bolt 202 having a threaded shank 204, a hex head 206 and a shoulder 208 having a tapered transition portion 210 initially engaging a deformable washer 212 fitting on the shank. When a nut 214 is screwed farther onto the shank to clamp plates 216 and 218 together, the washer is deformed when the shank has a desired predetermined minimum tension thereon. When the gap between the head abuts and the die is gone, there is a visual indication that the bolt has the desired minimum tension.

I claim:
1. In an energy absorbing buffer panel structure,
a vehicle body structure having dash panel frame means, panel means,
and energy absorbing fastener means operatively connecting the panel means to the frame means and including a plurality of dies secured to the panel means and a plurality of drawable rods secured to the frame means, said rods being operatively connected to said dies, each and having a threaded end portion,
the frame means having tapped bores receiving the threaded end portions.

* * * * *